(12) United States Patent
Jain

(10) Patent No.: US 7,390,116 B2
(45) Date of Patent: Jun. 24, 2008

(54) HIGH-BRIGHTNESS, COMPACT ILLUMINATOR WITH INTEGRATED OPTICAL ELEMENTS

(75) Inventor: Kanti Jain, Hawthorne, NY (US)

(73) Assignee: Anvik Corporation, Hawthorne, NY (US)

( * ) Notice: Subject to any disclaimer, the term of this patent is extended or adjusted under 35 U.S.C. 154(b) by 148 days.

(21) Appl. No.: 10/830,607

(22) Filed: Apr. 23, 2004

(65) Prior Publication Data

US 2005/0237764 A1 Oct. 27, 2005

(51) Int. Cl.
*G02B 6/00* (2006.01)
*F21V 7/00* (2006.01)

(52) U.S. Cl. ........................................ 362/551; 362/347

(58) Field of Classification Search ................. 362/551, 362/555, 341, 347, 245
See application file for complete search history.

(56) References Cited

U.S. PATENT DOCUMENTS

| 5,782,550 | A | * | 7/1998 | Ohashi et al. | ............... | 362/507 |
| 6,280,480 | B1 | * | 8/2001 | Tuttle et al. | ................ | 362/518 |

* cited by examiner

*Primary Examiner*—John A Ward
(74) *Attorney, Agent, or Firm*—Carl C. Kling

(57) ABSTRACT

A compact, high-brightness, integrated illuminator in which collection of light from a point-arc source is maximized by a multi-curvature reflector section configuration of elliptical reflector and segmented spherical retroreflector directing all light rays into a well-defined numerical aperture. The invention also integrates a homogenizer and other optical elements with the multi-curvature reflector section, constructs any or all of these components in a single block of optical material, or, alternatively, constructs these components with molded hollow reflective cavities fabricated in metal or plastic blocks. Cooling is provided by internal fluid channels within the block.

8 Claims, 11 Drawing Sheets

HIGH-BRIGHTNESS, COMPACT ILLUMINATOR WITH INTEGRATED OPTICAL ELEMENTS

FIELD OF THE INVENTION

This invention relates to light sources and illumination systems for optical projection, and specifically relates to such applications in which it is important to maximize the light collection from a source lamp, to minimize the size and power requirement of the lamp, to make the spatial uniformity of the lamp's light beam high, and to collect the light within a specified numerical aperture so as to optimize the imaging performance of the projection system.

BACKGROUND OF THE INVENTION

A key subsystem in optical systems for a variety of applications is an illumination system which comprises a light source, such as an arc lamp, and several optical components, such as mirrors and lenses, to collect, shape and relay the light from the source to the desired destination. For example, in a projector, light from an arc lamp is collected, made uniform, and made to illuminate an object, such as film or a programmable spatial light modulator, which is then imaged onto a display screen. As another example, in a lithography system, light from the light source is collected, made uniform, shaped into a specific cross-section, and is made to illuminate a photomask having a pattern. The mask is then imaged by a projection lens to a substrate, such as a semiconductor wafer or a display panel, coated with a layer of photosensitive medium.

In all these applications, the intensity of the light illuminating the object must be very uniform spatially. The object, as stated earlier, is, for example, a spatial light modulator (SLM) chip in a projector, or a photomask in a lithography system. Spatial uniformity of a light beam means that the cross-sectional profile of the intensity must be substantially flat. A second important requirement on the illumination system is that its efficiency must be as high as possible so that loss of light is minimized and the smallest possible light source may be used. Alternatively, the highest possible energy may be obtained at the destination surface, such as the display screen or the semiconductor wafer.

Other highly desirable features in an illumination system include compact size and self-luminosity. The importance of a compact size of the illumination system is self-evident—it enables the whole optical system to be compact, and therefore, low-weight, more portable, etc. Self-luminosity of a light source means it is equivalent to an emission surface on which every point behaves effectively as an emission point from which light rays emanate in a specific numerical aperture. Such a characteristic is especially important when the illuminated object must be subsequently imaged with high resolution onto another surface. All of the above desirable features of illumination systems are important in the case of digital projections, lithography systems, and numerous other optical systems.

A self-luminous emission surface is readily obtained by transformation of a high-brightness, point-like light source by use of suitable optical elements. A widely used, high-brightness, point-like light source is a high-pressure, compact, Hg (or Hg—Xe) arc lamp. To increase the amount of collected radiation, and direct it toward the object, such an arc lamp is usually manufactured with a built-in elliptical reflector. An elliptical reflector has two focus points, which I shall call "near focus" and "far focus." The point-arc of the lamp is situated at a focus point of the elliptical reflective surface, which causes the reflected rays to be directed toward the other focus point of the ellipse, enabling them to enter a beam-uniformization device at a desired numerical aperture. In all such light sources, the requirement of maximum collection efficiency on the one hand and a well-defined numerical aperture on the other hand cannot both be met optimally. This is so because, to maximize light collection, one must use as large a portion of the elliptical surface as possible, whereas to confine the reflected rays to the desired numerical aperture, one must limit the extended arc of the reflector.

SUMMARY OF THE INVENTION

This invention eliminates the need for a trade-off, in an illumination system, between the two desired requirements—collection efficiency and well-defined NA. This invention provides a light source configuration with the maximum possible light collection efficiency, and directs all the collected light into the pre-designed numerical aperture. Further, the disclosed configuration also provides integration of an uniformizer device into a single compact module. Finally, the reflector housing and body are so designed that cooling channels can be built into the lamp construction for cooling the lamp, with air or with a liquid in a closed-loop system.

This invention discloses a construction for a compact arc lamp in which collection of light from a point-arc source is maximized by a multi-curvature reflector section configuration in such a way that not only all of the collected radiation is focused at a point, but it is also directed into a well-defined numerical aperture. The invention also shows how such a high-efficiency lamp is integrated with an intensity homogenizer, making it possible to provide a compact, integrated light source for applications in projectors, displays, projection television, and exposure systems. As illustrated in FIG. 1, a point-arc source 1 is placed at the near focus 2 of an elliptical reflector 3, which directs the reflected rays (e.g., 4) to the far focus 5 of the ellipse 6. The arc-extent (from 7 to 8) of the elliptical reflector 3 is such that the outermost light rays (reflected from near its perimeter, e.g., 9) define the desired numerical aperture α, for the radiation. I shall therefore call them "intra-NA rays." All other light rays, which I shall call "extra-NA rays," in prior art lamp designs would be lost because they would not be directed to the far focus 5 of the ellipse. The loss of such rays could be reduced by extending the arc of the elliptical reflector, but then the numerical aperture of the collected rays would increase beyond the desired angle. In this invention, the loss of these "extra-NA rays" is eliminated by constructing the lamp reflector as follows:

The NA-defining arc of the reflector surface is made elliptical, as stated. Beyond the solid angle subtended by this arc, the reflecting surface is extended by a series of spherical segments 10-13 whose center is the near focus 2 of the elliptical surface. All extra-NA light rays striking these spherical segments (e.g., 14) are directed back toward and through the near focus 2, so that when they are then reflected by the elliptical surface behind the near focus, they are brought to a focus at the same far focus 5 of the ellipse where all the "intra-NA" rays, which were reflected directly by the elliptical surface, are focused. I shall call such a reflector an "EllipSpheRetro Reflector," or ESR Reflector. The lamp construction of this invention thus nearly doubles the "useful" light efficiency of the lamp. In addition, as also illustrated in FIG. 1, a solid light-tunnel homogenizer 15 is integrated with the reflector enclosure, rendering the integrated unit extremely compact and manufacturable at a low cost. In the Detailed Description of the Embodiments, I describe several such reflector designs and integration configurations.

An object of the invention is to make useful all of the light from an arc lamp by combining an elliptical reflector with a set of concentric spherical retro-reflector segments.

A feature of the invention is the positioning of the center of the spherical reflector segments, at the near focus of the elliptical reflector, to retain the numerical aperture.

Another feature of the invention is the segmenting of the spherical reflector to maintain the focus at the near focus of the elliptical reflector while minimizing the outer envelope of the segmented spherical reflector and thus the overall size of the lamp-reflector subassembly.

Still another feature is the combination of homogenizer with elliptical reflector and spherical retro-reflector segments for compact configuration.

Yet another feature is the embodiment of the combination of homogenizer with elliptical reflector and spherical retro-reflector segments as a solid block of material for good thermal management characteristics and easy manufacturability.

An advantage of the invention is the high brightness of the lamp with high efficiency of light collection.

Another advantage of the invention is its integrated configuration that combines a lamp and reflectors with uniformizer and other optical elements.

Yet another advantage of the invention is its compactness consistent with good optical and heat-dissipation qualities.

Other objects, features and advantages will become clear to those skilled in the art during reading of the following text and perusal of the attached drawings.

FIGURES

Figure 15:
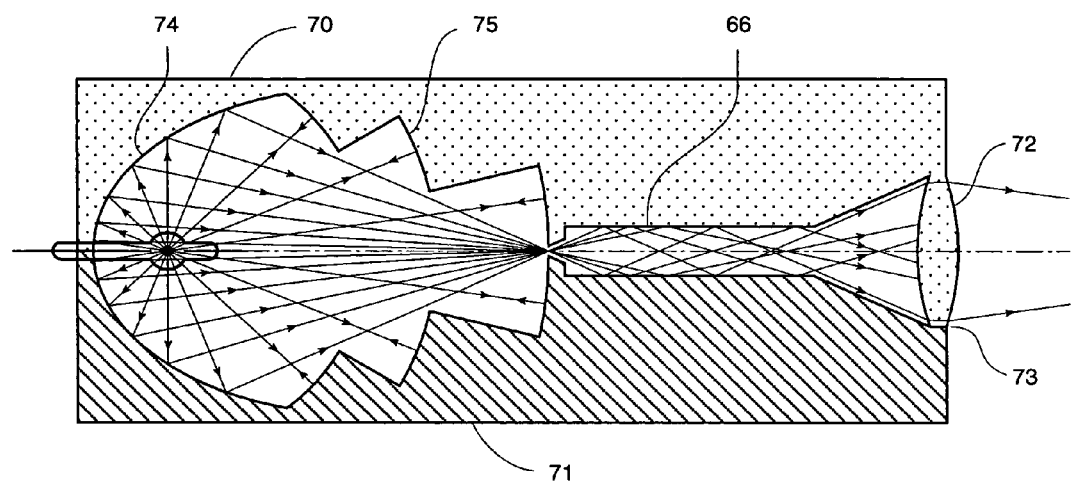
FIG. 15 is an illustration of a preferred embodiment of the invention, showing a short-arc lamp housed within a two-piece block assembly, the blocks fabricated to provide an elliptical reflector surface, a set of spherical retro-reflecting segments, a light tunnel homogenizer section, and an imaging lens.
Figure 16:
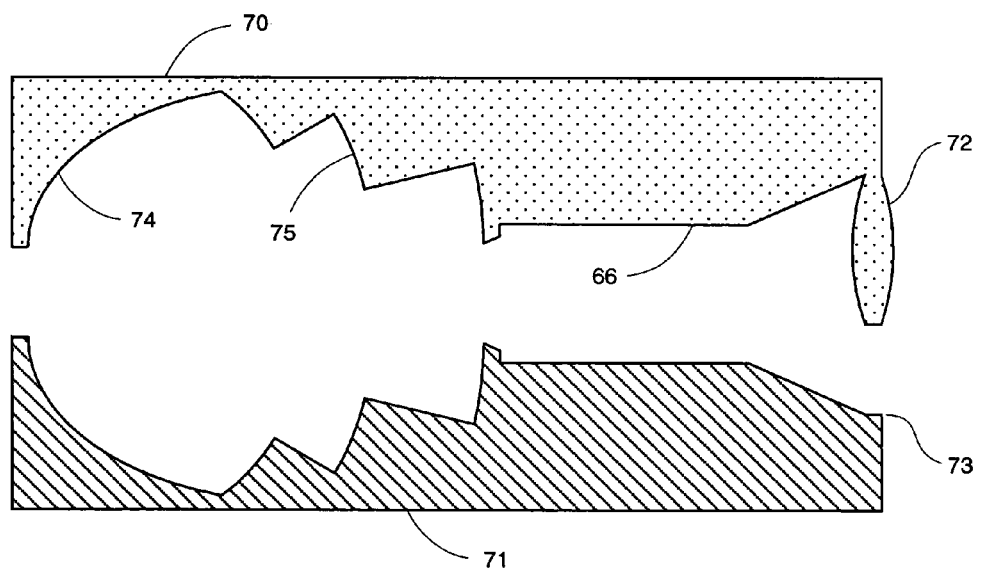
FIG. 16 illustrates the construction details of the embodiment of FIG. 15, showing how the entire assembly is made of two molded sections.
Figure 17:
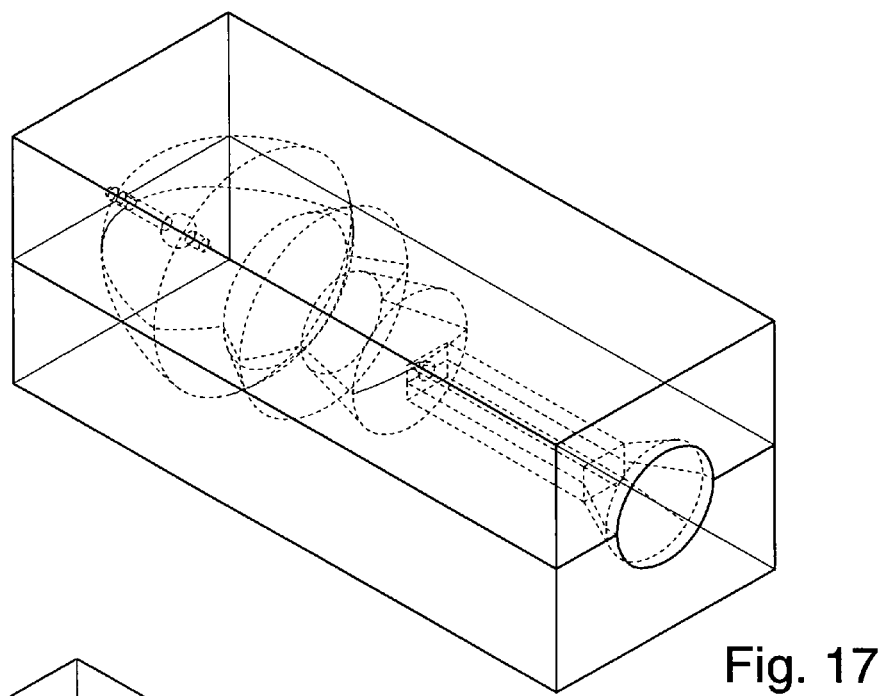
Figure 18:
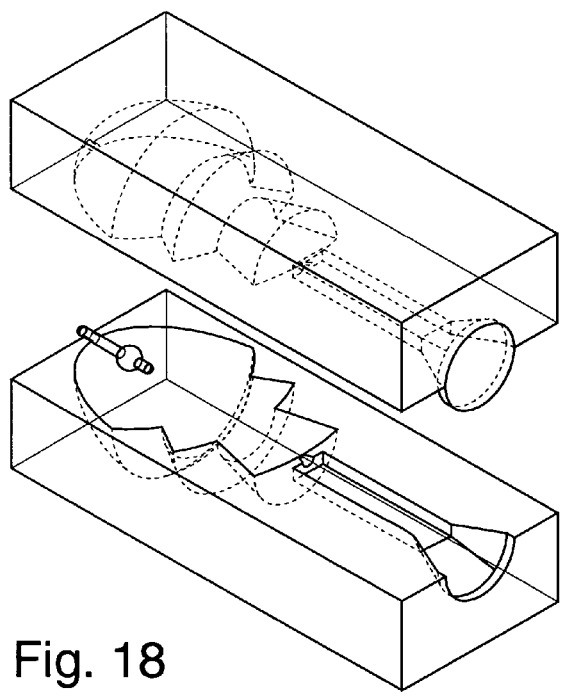

FIGS. 17 and 18 present three-dimensional perspectives of the illustrations of FIGS. 15 and 16.

Figure 19:
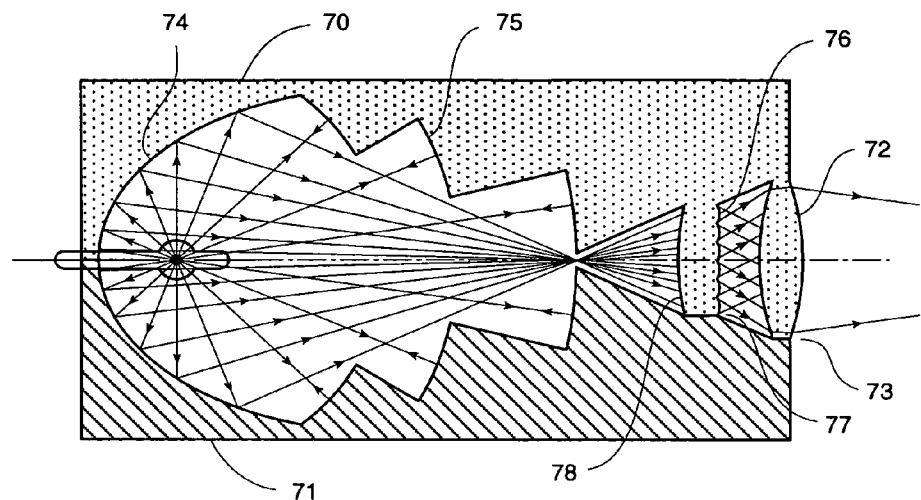

FIG. 19 is an illustration of a preferred embodiment of the invention, showing a short-arc lamp housed within a two-piece block assembly, the blocks fabricated to provide an elliptical reflector surface, a set of spherical retro-reflecting segments, a fly's-eye-lens homogenizer combined with a collimating lens, and an imaging lens.

Figure 20:
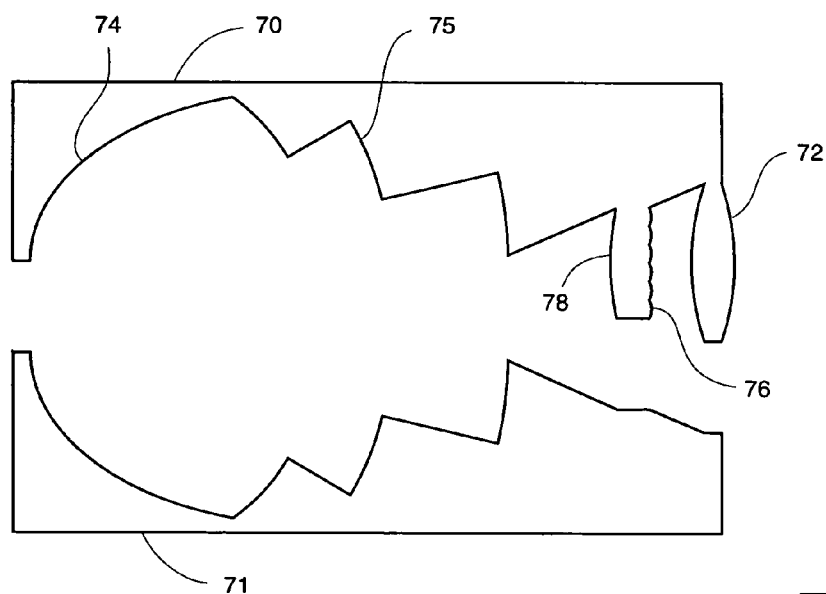

FIG. 20 illustrates the construction details of the embodiment of FIG. 17, showing how the entire assembly is made of two molded sections.

Figure 21:
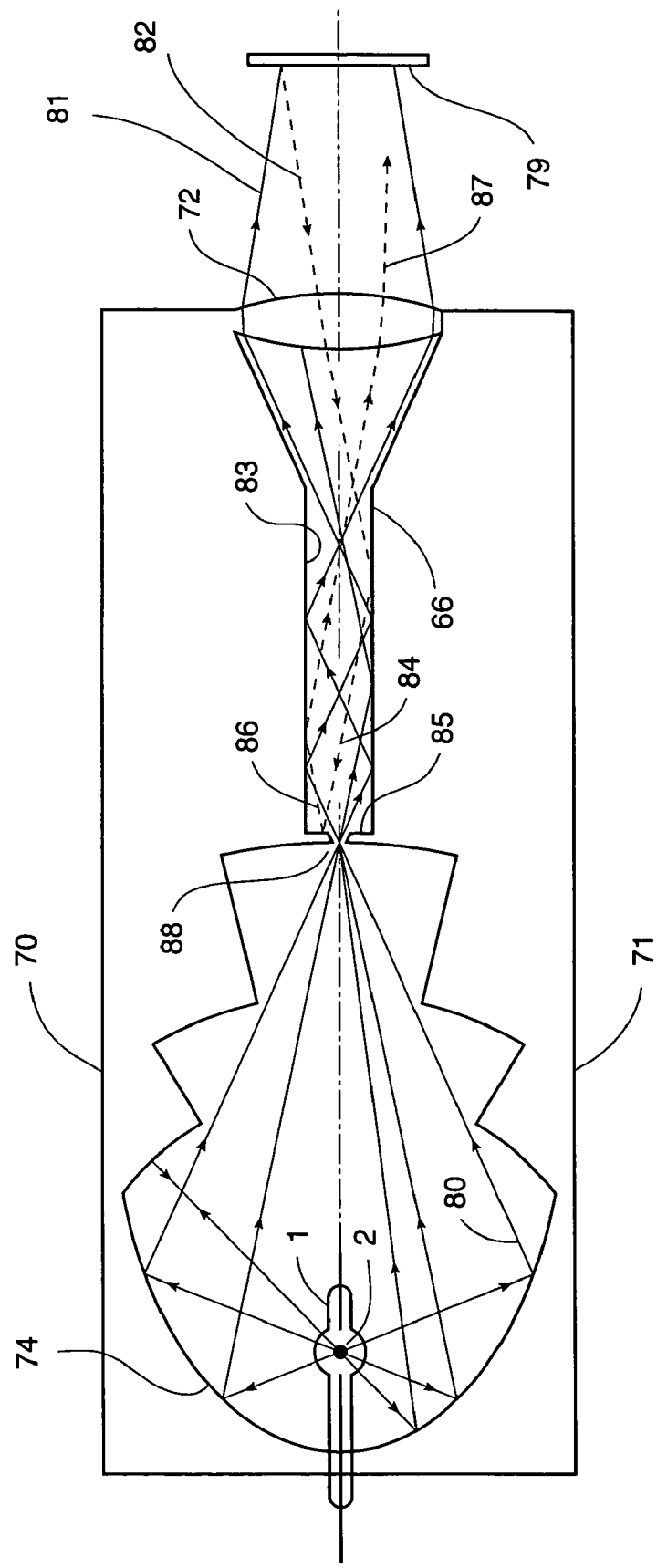

FIG. 21 is an illustration of a preferred embodiment of the invention, showing a short-arc lamp housed within a two-piece block assembly, the blocks fabricated to provide an elliptical reflector surface, a spherical retro-reflecting segments, an energy-recycling light tunnel homogenizer section, and an imaging lens.

Figure 22:
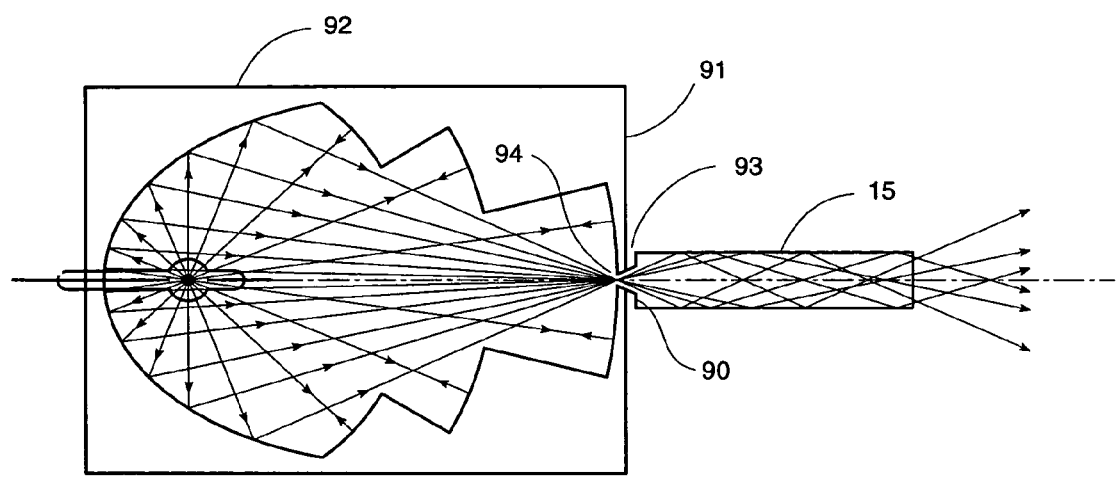

FIG. 22 is a preferred embodiment of the invention showing a short-arc lamp in a block enclosure that has an elliptical reflector surface, spherical retro-reflector segments, and an energy-recycling solid light-tunnel homogenizer section.

DETAILED DESCRIPTION OF THE EMBODIMENTS

Figure 2:
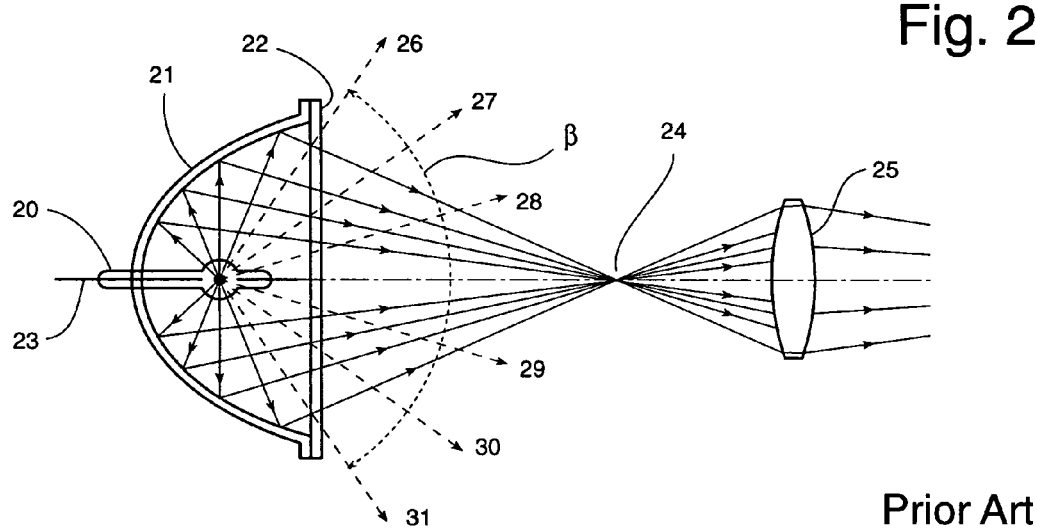
FIG. 2 shows a prior-art arc-lamp with an elliptical reflector, illustrating how a majority of the forward-emitted rays from the lamp are not collected.
Figure 3:
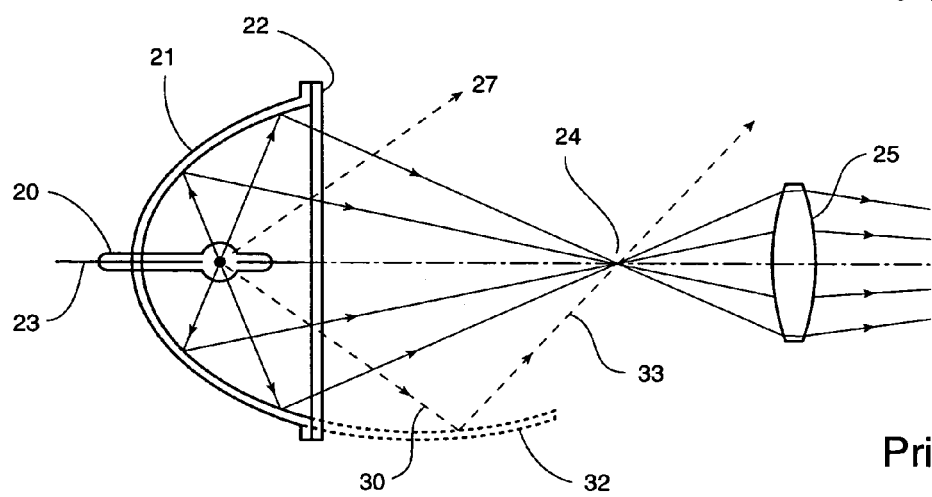
FIG. 3 is a further illustration of a prior-art lamp, showing how an extension of the elliptical reflector does not improve collection of forward-emitted rays.

Arc lamps are used as light sources in a wide variety of applications, such as electronic data projectors, film projectors, projection televisions, and exposure systems for microelectronics fabrication. A typical prior-art construction of an arc lamp is shown in FIG. 2. It comprises a short-arc, high-pressure, Hg or Hg—Xe discharge lamp 20, with an elliptical reflector 21, and is sealed with a window 22 in the front. The point-arc of the lamp is placed at the near-focus 23 of the reflector's elliptical surface. Light rays incident on the reflector surface are directed toward the far focus 24 of the ellipse, from where they may be directed toward an object surface in various prior-art ways, such as with a positive lens 25. Note that among all the rays emitted by the lamp, the effectively useful rays are only those that first reach the point 24 and are then directed by lens 25, i.e., only the rays emitted by the arc that first strike the elliptical reflector. Therefore, all the rays, such as 26-31, emitted in a forward cone defined by the angle β, are not collected, and are thus lost. Note that these lost rays cannot be collected by simply extending the elliptical arc-extent of the reflector—as shown in FIG. 3. If the elliptical reflector arc is extended by the portion 32 so as to prevent ray 30 from escaping, then ray 30 will be intercepted, and, after reflection as ray 33, will reach the far focus 24. Even so, rays such as ray 33 still will not be collected by lens 25 because they are extra-NA light rays, outside the collectible NA, and therefore will be lost. Depending upon the lamp dimensions, these lost rays may constitute a third or half of the total radiation emitted by the lamp. Thus, if these otherwise lost rays could be effectively collected, the useful light efficiency of the lamp could be increased by as much as a factor of 2. Such is the improvement made possible by the invention described in this application.

Effective Collection of "Extra-NA" Light Rays

At the outset, let me clarify the distinction between "effective collection" and mere collection of light rays. Referring to FIG. 3, the light ray 30, upon reflection from the elliptical reflector segment 32, is collected as ray 33 and directed to the focus point 24, but such collection is not useful because ray 33 is not accepted by lens 25. When a ray emitted by the lamp arc is so directed that it is within the acceptance cone of the lens 25, i.e., it is an intra-NA ray, within the specified numerical aperture, I shall term its collection as "effective collection."

Now I describe how the extra-NA rays can be effectively collected, thereby increasing the effective brightness and efficiency of the lamp substantially.

Figure 4:
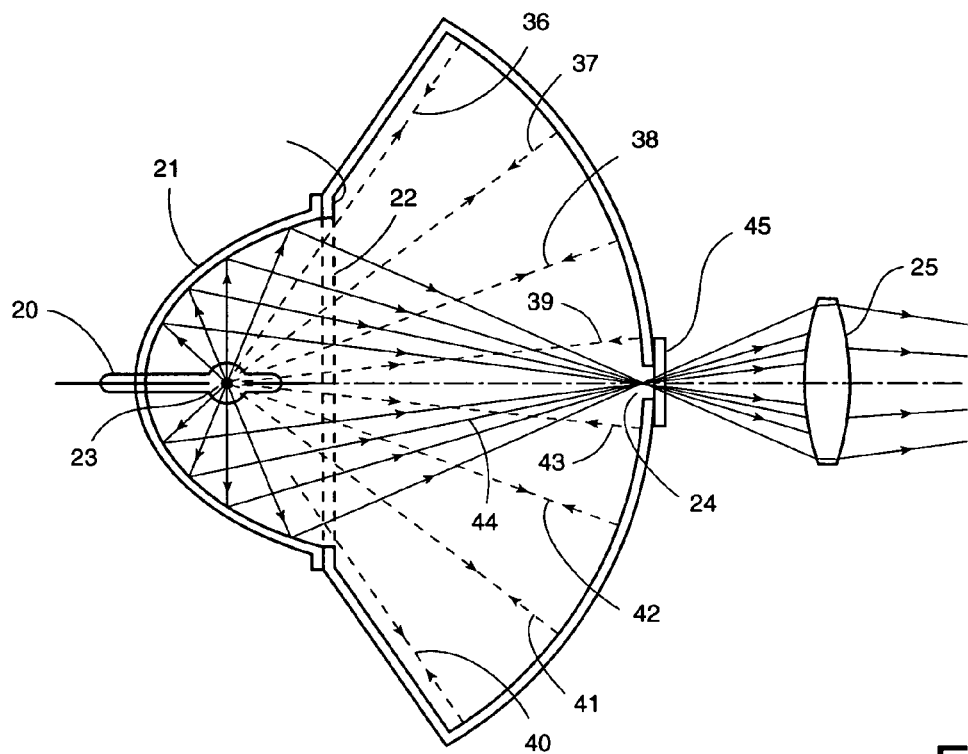
FIG. 4 is a schematic of one of the embodiments of the invention, showing a short-arc lamp with an elliptical reflector and a spherical retro-reflector for collection of all the forward-emitted rays.

FIG. 4 illustrates the basic principle of the new EllipSpheRetro (ESR) lamp concept. The lamp envelope is designed to include not only the elliptical reflector 21, which collects, as before, all the intra-NA rays, but also a spherical reflector 35 whose arc-extent is such that it captures all the extra-NA rays such as rays 36-43. Further, the curvature and placement of the spherical reflector 35 are such that its center is the same as the near focus 23 of the elliptical reflect 21. Therefore, an extra-NA ray, such as ray 37, is retro-reflected by the spherical reflector 21, travels through the near focus 23, is reflected by the elliptical reflector 21, is directed as ray 44 through the same far focus 24, and is angularly confined within the specified NA. Thus, by capturing nearly all the extra-NA rays which otherwise would be lost, this ESR reflector lamp nearly doubles the radiation delivered to the imaging lens 25 within the desired numerical aperture. Note that the window 22 which previously (see FIG. 3) functioned as the front face of the lamp enclosure, is now not necessary; it is therefore eliminated and, instead, a window 45 is provided as a seal on an opening in the spherical reflector 35. I will describe other embodiments of the lamp construction shortly.

Compact ESR Reflector Lamp Configuration

Note that in the embodiment of the invention illustrated in FIG. 4, the incorporation of the spherical retro-reflector nearly doubles the size of the overall enclosure of the lamp, which is not a desirable consequence. Such an increase in the lamp size is prevented by the embodiment shown in FIG. 5. Here, the previous spherical reflector 35 is broken up into several spherical segments 46-51. Each of the spherical segments 46-51 has a curvature and position such that its center is at the same near focus 23 of elliptical reflector 21. Additionally, the partitioning of the previous spherical reflector 35 into the new spherical segments 46-51 is done in such a way that it becomes possible to place the new segments as close as possible to the outermost rays 52 and 53. These outermost rays 52 and 53 define the specified numerical aperture a. Note that, constructionally, each pair of equivalent spherical segments, e.g., 46 and 51, are together a strip-slice of a spherical shell. Additionally, note that the largest-radius segments 48 and 49 are constructionally a spherical disc, and that this disc has a hole in the center where the far focus of the elliptical reflector 21 is situated; this hole is sealed with the optical window 45, as shown in FIG. 5.

Block Configuration with Reflector Cavity

Figure 5:
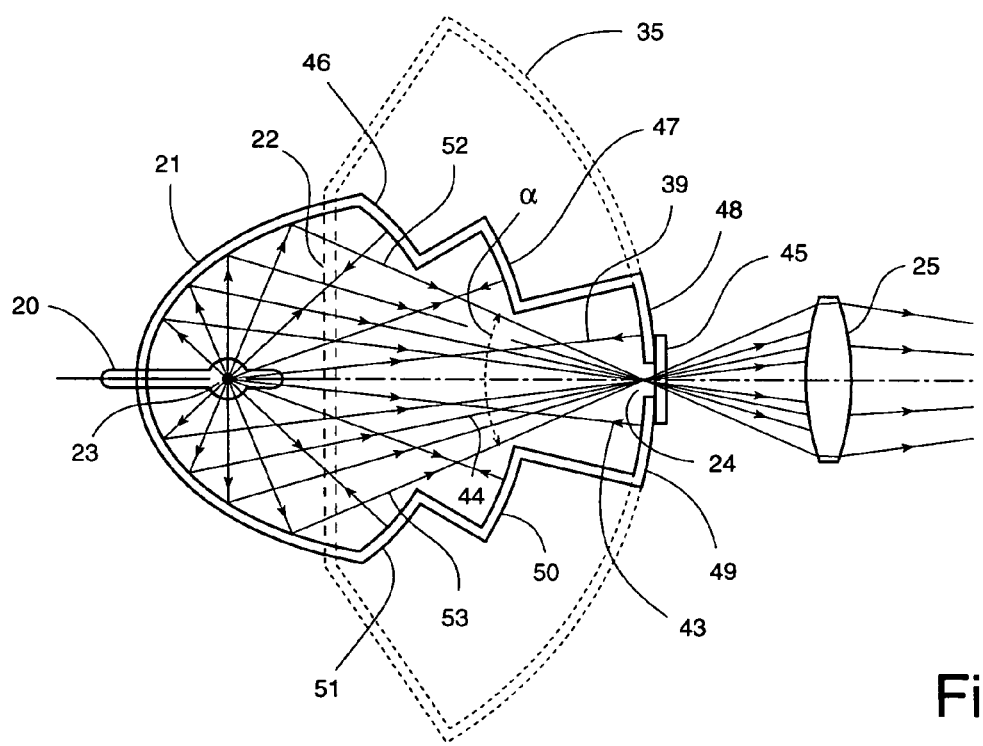
FIG. 5 is an illustration of a preferred embodiment of the invention, showing a short-arc lamp in a reflector housing, the reflector having an elliptical section and several spherical retro-reflecting segments.
Figure 6:
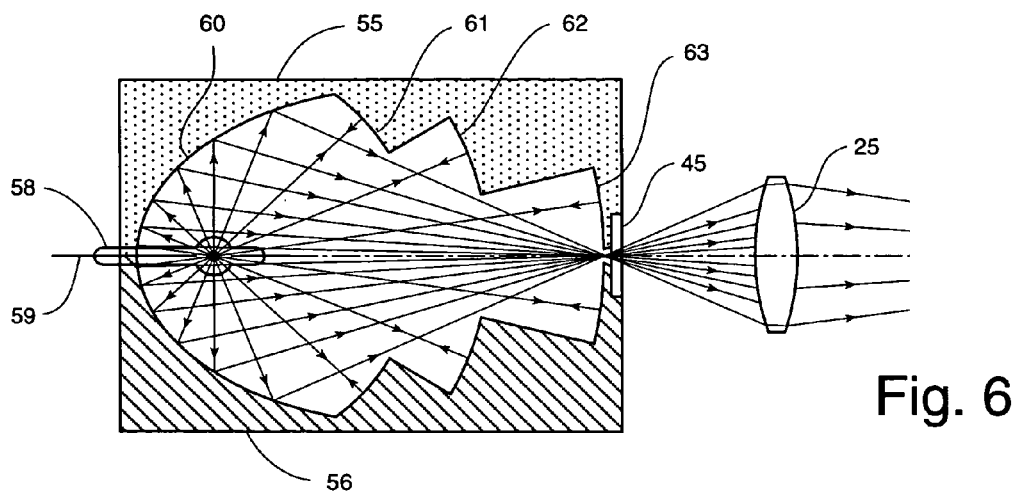
FIG. 6 is an illustration of another preferred embodiment of the invention, showing a short-arc lamp within a reflector block enclosure made of two blocks, the reflector surface having an elliptical section and spherical segments.
Figure 7:
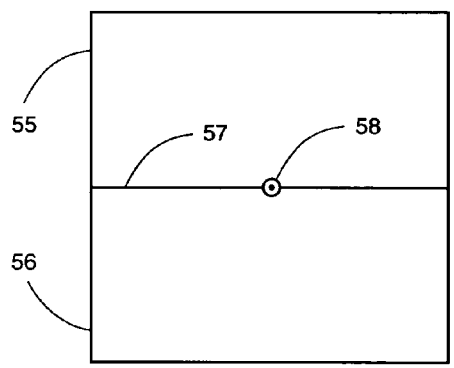
FIGS. 7 and 8 are illustrations of the end views of the embodiment of FIG. 6.
Figure 8:
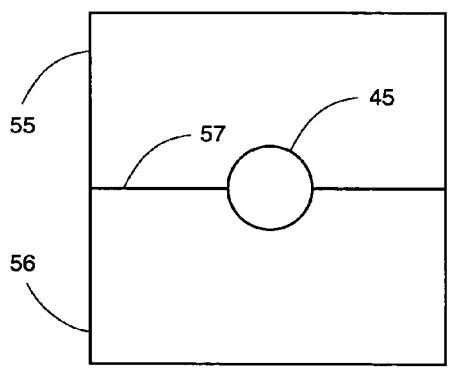

The ESR Reflector lamp design illustrated in FIG. 5 may be readily constructed in practice as a block enclosure in which the reflector surface is realized by forming a cavity. This is illustrated in FIGS. 6, 7 and 8. The full enclosure is made as two halves 55 and 56, each of which has one-half of the lamp cavity hollowed out from inside and coated with a durable, high-reflectivity coating. The elliptical reflector surface is indicated by 60 and the spherical reflector segments by 61-63.

Figure 9:
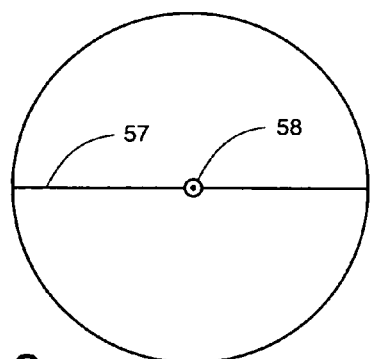
FIGS. 9 and 10 are illustrations of the end views of an embodiment of the invention similar to that of FIG. 6, except that the outer perimeter of the cross-section of the reflector block assembly is circular rather than square.
Figure 10:
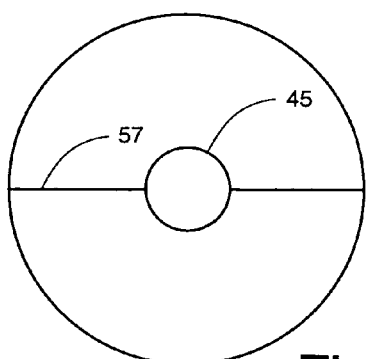

FIG. 7 is an end-view of the lamp, looking at FIG. 6 from the left, and FIG. 8 is the end-view of the lamp looking from the right. The perimeter of the cross-section of the enclosure is shown as a square (FIGS. 7 and 8). As an alternate embodiment, the perimeter can be circular, as illustrated in FIGS. 9 and 10. The two half-blocks of the enclosure can be joined with each other using a suitable high-temperature adhesive along the interface 57. Provision is made on the left end-faces (FIGS. 7 and 9) for an end of the arc lamp discharge tube 58 and electrodes 59 to emerge. On the right end-faces, the transparent window 45 is suitably sealed.

High-Brightness-Lamp Enclosure with Cooling

Figure 11:
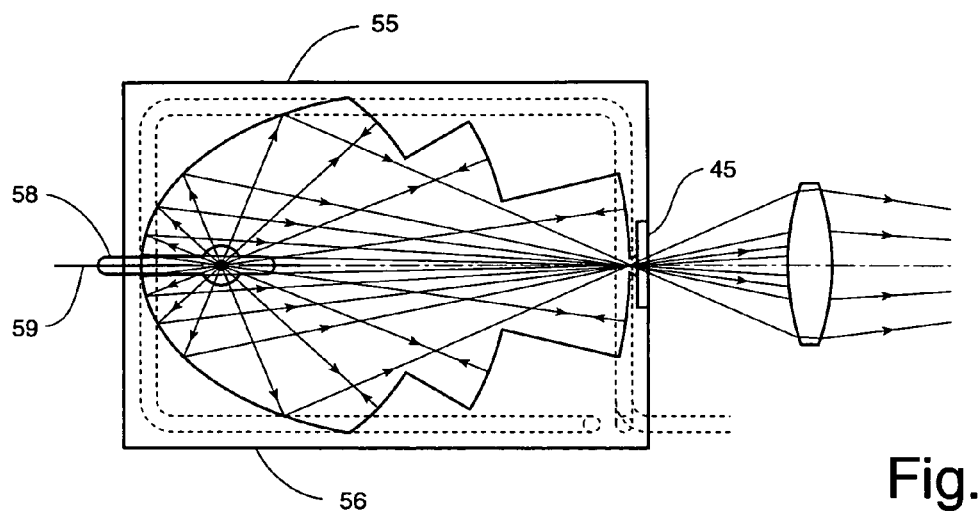
FIG. 11 illustrates an embodiment of the invention showing a short-arc lamp in a reflector block assembly similar to that of FIG. 6 but with the addition of built-in cooling channels.
Figure 12:
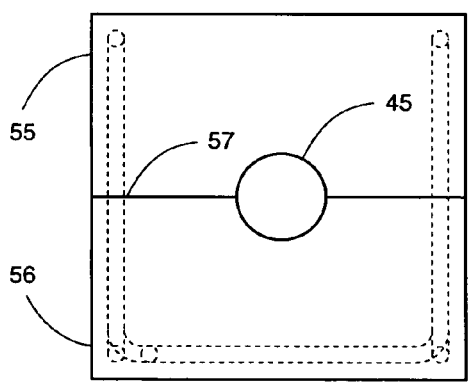
FIG. 12 is an end-view of the embodiment of FIG. 11.

Since the high-brightness lamp configurations shown in FIGS. 6-10 dissipate 100-200 W of power, it is highly desirable to provide a built-in cooling mechanism in their enclosures. The constructions illustrated in FIGS. 6-10 enable very convenient incorporation of cooling channels, as shown in FIGS. 11 and 12. The cooling channels may be formed at the time the half-blocks are molded, and run through the solid walls of the reflector half-blocks. The cooling fluid may be air, water, ethylene glycol solution or some other suitable coolant. The channels may continue from one half-block to the other half-block, in which case appropriate fluid-tight seal is provided between the two half-blocks. Note that the path of the cooling channels, as well as their construction shown in FIGS. 11 and 12, is only one of may possible paths of embedding the channels in the reflector housing; various alternate but equivalent configurations can readily be devised by one even cursorily knowledgeable in the art.

In some optical devices, when rays emitted from a point source are directed back to the source, some instability of the source or excessive heating may occur. In an arc lamp of the type envisioned here, the typical size of the emission region is 1-2 mm, for which such undesirable effects are not expected to occur. However, to eliminate such a possibility entirely, the spherical retro-reflector segments can be readily designed to be slightly off their perfect position or curvature so that the retro-reflected rays are focused suitably offset from, but close to, the near-focus of the elliptical reflector.

ESR Lamp with Homogenizer

Figure 13:
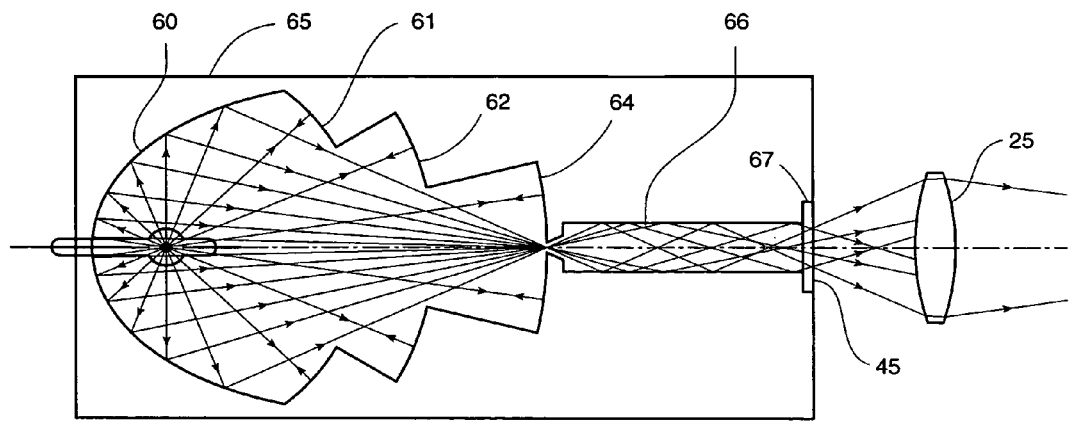
FIG. 13 is a preferred embodiment of the invention showing a short-arc lamp in a block enclosure that has an elliptical reflector surface, spherical retro-reflector segments, and a light-tunnel homogenizer section.

The compact high-brightness lamp with the ESR reflector described above can be further enhanced in functionality by integration of an intensity homogenizing component, as illustrated in FIG. 13. The reflector unit is configured as before, i.e., as a combination of an elliptical reflector 60 and segmented spherical retro-reflectors 61-64, integrated as a block assembly 65, as in FIG. 6. But now, in addition, the block assembly 65 also includes a cylindrical cavity 66, whose internal surface is mirrorized, and which acts as an intensity uniformizer. The cylindrical cavity 66 functions as a light tunnel with internally reflective walls. All the light rays emitted from the arc lamp and collected by the elliptical and spherical reflectors are focused near the entrance to the light tunnel homogenizer 66. These light rays enter light tunnel homogenizer 66 as shown in FIG. 13. The light rays get randomly mixed, by multiple reflections within the homogenizer, so that the spatial intensity distribution at the exit plane 68 of the homogenizer is highly uniform.

Note that the homogenizer tunnel is sealed by a transparent window 45 at the exit plane. The exit plane 68 of the homogenizer may now be conveniently imaged by a lens 25 onto the desired object surface. Suitable cooling channels may be provided in the reflector block assembly as described previously, with FIGS. 11-12.

ESR Reflector Lamp with Integrated Lens

Figure 14:
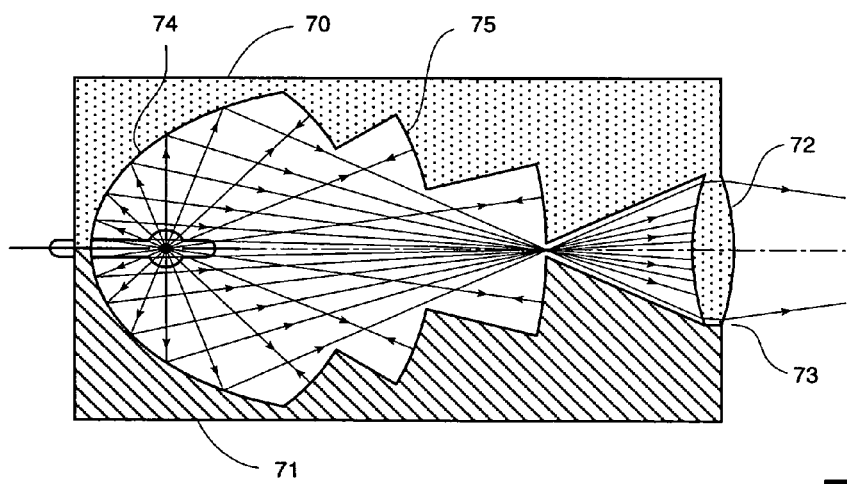
FIG. 14 is an embodiment of the invention showing a short-arc lamp in a reflector block housing that also has an imaging lens.

In the embodiment of FIG. 6, I have shown a lamp enclosure made of two reflector blocks 55 and 56 and a transparent window 45. In addition, an external lens 25 is used to direct the collected rays to the object surface. I now illustrate how the entire assembly can be further simplified and made easier to fabricate at a lower cost by integrating the lens as a part of the reflector blocks and eliminating the window, as shown in FIG. 14. The lamp enclosure is made of two reflector blocks 70 and 71, and the lens 72 is made a part of one of them (70). Note that the lens 72, as a part of block 70, is brought into contact with block 71 at interface 73; keeping the body of the lens free of additional interfaces enables it to have high optical performance.

Note that only the elliptical (74) and spherical (e.g., 75) retro-reflector portions of the internal surface of each block are mirrorized. In addition, the surfaces of the lens 72 may be coated with an anti-reflection coating to minimize unwanted reflection losses. Also, as in the embodiments of FIGS. 11 and 12, cooling channels may be fabricated in the blocks 70 and 71.

Elliptical-Spherical Lamp with Integrated Homogenizer and Lens

The embodiments described in FIGS. 13 and 14 may be combined to provide a new embodiment in which the lamp enclosure is integrated with both a homogenizer and a lens; this is illustrated in FIGS. 15-18. The entire assembly is constructed of two blocks 70 and 71. Each block has one-half of the elliptical reflector 74, the spherical retro-reflector segments (e.g., 75) and the homogenizer tunnel 66. The lens 72 is made entirely a part of block 70, as shown in FIG. 16, and makes contact with block 71 at interface 73. Again, cooling channels may be provided in the body of each block. The surfaces of the reflectors and homogenizer are mirrorized. The lens surfaces are anti-reflection coated.

In all of the embodiments above in which a light-tunnel homogenizer is incorporated (e.g., FIGS. 13 and 15) it is also possible to provide a different type of light homogenizer as an alternative to the light-tunnel type 66. For example, in FIGS. 19 and 20, I illustrate how a fly's-eye lens type of uniformizer 76 may be fabricated as a part of one of the two blocks 70 and 71 that make up the lamp enclosure assembly. As before, I show the elliptical reflector as 74, one of the spherical retro-reflector segments as 75 and the imaging lens as 72. The fly's-eye lens array 76 is a two-dimensional array of small lenslets and is readily fabricated by well-established molding processes. The lens array 76 comes in contact with block 71 at interface 77. Note that I have also shown the input surface (left side) 78 of the fly's-eye lens array 76 as a convex surface; this serves to collimate the rays inside the body of the fly's-eye lens array. Many other alternate configurations are possible, such as fabricating a collimating lens separately or using two fly's-eye lens arrays.

Compact, High-Efficiency Lamp with Integrated Energy-Recycling Homogenizer

The efficiency and brightness of the compact ESR illuminator shown in FIG. 15 can be further enhanced by providing an energy-recycling feature in the homogenizer 66. This is especially important in the use of such an illuminator in, for example, an electronic data projector or a projection television where the lamp power, compactness and brightness are significant criteria in product design. In a color projector, the white light from the illuminator first passes through a color filter unit, which is usually a color wheel with red, green and blue spiral bands. Each band transmits only one color. For example, light of only red frequency passes through the red band, the rest (approximately two-thirds of the total) being reflected and lost. By using a recycling homogenizer, the reflected rays are captured and re-utilized, as illustrated in FIG. 21.

In FIG. 21 a ray 80 leaves the elliptical reflector 74, enters the homogenizer 66, is reflected from the bottom homogenizer wall 83, emerges from imaging lens 72 as ray 81, and strikes color filter unit 79. The frequencies of light that do not pass through filter 79 are reflected as ray 82, which, traveling in the reverse direction, passes through the imaging lens 72, re-enters the homogenizer 66, is reflected from the bottom homogenizer wall 83 as ray 84, and strikes the inner side 85 of the homogenizer input face. The inner face 85 is mirrorized, so the ray 84 is reflected as ray 86, which is now traveling in the forward direction, and emerges from imaging lens 72 as ray 87, thus being re-utilized. The energy-recycling feature of this embodiment can increase the efficiency and brightness of the illuminator by a factor of two or more. To maximize the energy recycling multiplier, the area of the homogenizer inner face 85 must be made as large as possible, and therefore, the entrance hole 88 as small as possible. Note that the minimum size of entrance hole 88 will be determined by the focus spot size of the elliptical reflector 74, and therefore also on the size of the point arc 2 of the lamp 1. I remark that the entire illuminator assembly can be constructed, as before, of two blocks 70 and 71, in which cooling channels may also be provided if desired.

Illuminator with Solid Homogenizer

Figure 1:
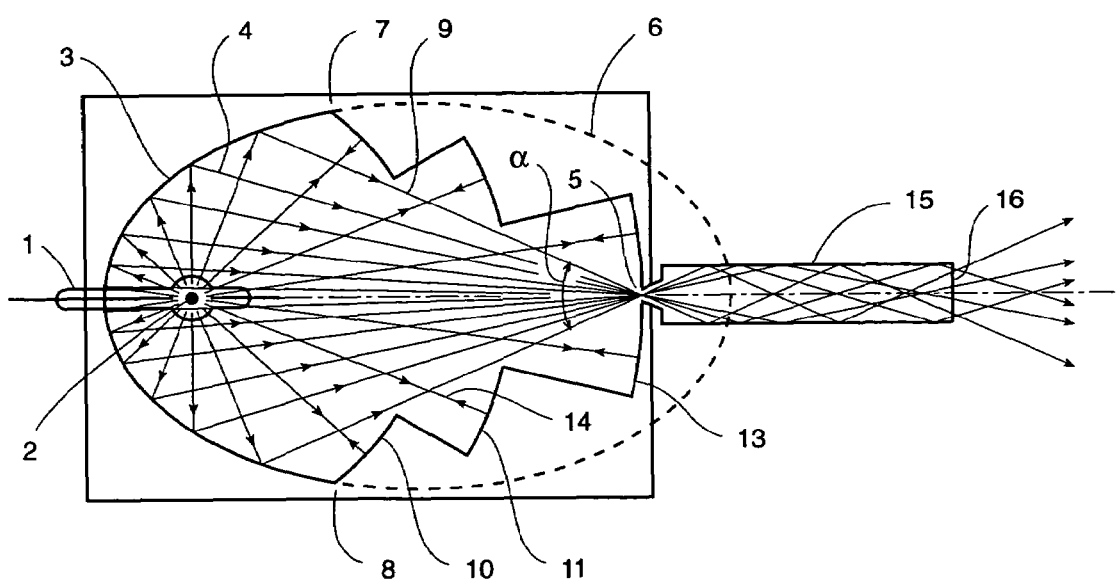
FIG. 1 is a schematic illustration of the concept of the invention, showing a short-arc lamp in a reflector cavity with an elliptical forward-reflecting surface, spherical retro-reflecting segments, and with a joined intensity homogenizer.

In the embodiments shown in FIGS. 13, 15 and 21, 1 have described a light-tunnel homogenizer that is hollow and in which the multiple reflections of the rays take place from mirrorized walls. Alternatively, the light-tunnel homogenizer can be made as a solid rod of a highly transparent optical material such as fused silica or a suitable glass. In such a solid homogenizer, the reflections of the light rays take place by the phenomenon of "total internal reflection" (TIR). Such an embodiment is shown in FIG. 1 in which 15 represents the solid rod homogenizer. The cross-section of the rod may be circular, square, rectangular or hexagonal. Since the angle of incidence in total internal reflection must be greater than the "critical angle" (given by $\sin^{-1}(1/n)$ where n is the refractive index of the rod material) the maximum numerical aperture (NA) of the light cone is limited. If it is desired to have an NA greater than such limit, the surface of the rod may be mirrorized. I wish to point out that the exit face (16 in FIG. 1) of the homogenizer should preferably be coated with an anti-reflection coating to eliminate the nearly 4% reflection loss that would otherwise take place at an uncoated glass-air interface.

An embodiment of the compact, high-brightness illuminator of this invention with a solid homogenizer having the energy-recycling feature is sown in FIG. 22. Note that in order to provide a reflective inner surface 90 for the input face of the solid homogenizer 15, the homogenizer input face must be separated from the end face 91 of the reflector block 92 by a slot 93, and surfaces of the slot must be mirrorized. Note that the portion of the homogenizer input face where the forward-traveling light rays enter must be left unreflective (or preferably even made anti-reflective). Therefore, the reflective portion of the inner surface of the homogenizer input face is a smaller fraction of total input face area in a solid homogenizer than in a hollow homogenizer because the focus region 87 in FIG. 22 can be right at the input face of the hollow homogenizer 66, whereas the focus region 94 in FIG. 22 must be at some distance from the input surface of the solid homogenizer 15 so as to avoid damage to the input surface. Thus, in general, it may be expected that the energy-recycling efficiency of a hollow homogenizer may be greater than that of a solid homogenizer. However, the greater reflectivity from the walls in case of total internal reflection may favor the hollow homogenizer. The choice between the two will depend on the specific design criteria for a particular application.

In the description of the invention and its selected embodiments presented in this application, I have necessarily concentrated on an elliptical forward reflector, spherical segments as retro-reflectors, and light-tunnel and fly's-eye types of homogenizers. Clearly, to those skilled in the art, other variations will be imaginable to achieve the desired functionality of the invention. The broad theme of the invention is that it provides a compact, high-efficiency arc-lamp illuminator with the following fundamental design characteristics:

It collects most of the rays emitted by the arc in the backward direction by a forward-reflecting curved reflector and directs them into a specified cone angle or numerical aperture;

it collects most of the rays emitted by the arc in the forward direction, that otherwise would be lost, by curved retro-reflector segments and directs them into the same numerical aperture;

it uniformizes the transverse intensity distribution of the radiation so collected by mixing the rays using a homogenizer;

it images the uniformized radiation of the specified numerical aperture onto an object;

it simplifies the construction of the illuminator assembly by integrating the above functions into a uniform number of components; and it provides built-in cooling capability to remove the lamp-generated heat.

The end result of the above features is an arc-lamp illuminator that maximizes brightness and efficiency and minimizes size and power. Variations on the described embodiments that achieve the above features will be considered within the scope and spirit of this invention.

Materials

The invention lends itself to low-cost, high-volume manufacturing as well as easy prototyping and pilot production prior to volume manufacturing. A prototype may be easily machined from a metal such as aluminum or steel, or cast from a low-melting-temperature metal or metal alloy with or without further treatment by machining. Short production runs may even be made using such metal prototypes, with mirrorized surfaces as necessary. Such metal prototypes may then conveniently be used as models for production molds to be made of glass or other optical materials. In some cases, suitable plastic may be used in prototypes or even in production, with appropriate mirrorizing, cooling and explosion protection as necessary. For final production in quantity, glass or other optical materials are typically chosen, but since plastics and metals are easier to machine and weld or cement, the materials choice is very wide. This choice of materials for volume manufacturing as well as for prototyping and short production runs provides great economy of both production and design.

Utility

In addition to their use in electronic data projectors, displays and projection television, these Illumination devices have widespread utility wherever high-intensity forward light beams are desired. This includes landing lights for aircraft and headlights for automobiles, as well as a great variety of projection uses such as projection in theaters and arenas.

The invention has been shown in a number of embodiments and a number of alternative configurations. Changes in these, and other embodiments and alternative configurations will be apparent to those skilled in the art, without departure from the spirit and scope of the invention as depicted in the following claims:

I claim:

1. A compact, high-efficiency illuminator system comprising:
   a) a reflector chamber portion having a forward elliptical reflector with an axis with a near-focus position and a far-focus position with respect to such forward elliptical reflector, and having a spherical retro-reflector opposite such forward elliptical reflector surrounding an exit port, said spherical retro-reflector being opposite to said elliptical forward reflector;
   b) a point-source light emitting element, mounted at said near-focus on said axis intermediate said elliptical reflector and said exit port at said far-focus, arranged to emit light rays directed as follows:
      b1) a significant percentage of rays directed at said elliptical forward reflector for single-reflection out said exit port;
      b2) a small percentage of rays directed out said exit port without reflection; and
      b3) the remaining significant percentage of rays directed at said spherical retro-reflector for retro-reflection back to said elliptical forward reflector for re-reflection out said exit port.

2. A compact, high-efficiency illuminator system
   a) a reflector chamber portion having a forward elliptical reflector surface with an axis with a near-focus position and a far-focus position with respect to such forward elliptical reflector surface, and having a composite segmented spherical retro-reflector opposite such forward elliptical reflector and surrounding an exit port;
   b) a point-source light emitting element, mounted at said near-focus on said axis intermediate said forward elliptical reflector and said exit port, arranged to emit light rays directed as follows:
      b1) a significant percentage of rays directed at said forward elliptical reflector for single-reflection out said exit port;
      b2) a small percentage of rays directed out said exit port without reflection; and
      b3) the remaining significant percentage of rays directed toward said composite segmented spherical retro-reflector surface for retro-reflection back to said elliptical forward reflector and re-reflection out said exit port.

3. A compact, high-efficiency, illuminator system according to claim 2, further comprising:
   hollow homogenizing means (66), positioned along said axis, outside said exit port while inside the same block (65) comprising said lamp chamber.

4. A compact, high-efficiency, illuminator system, according to claim 2 further comprising:
   transmissive sealing means (45) located at said exit port.

5. A compact, high-efficiency, illuminator system comprising:
   a) a reflector chamber portion having a forward elliptical reflector with an axis with a near-focus position and a far-focus position with respect to such forward elliptical reflector, and having a composite segmented spherical retro-reflector opposite such forward elliptical reflector and surrounding an exit port b) a point-source light emitting element, mounted at said near-focus position on said axis intermediate said forward elliptical reflector and said exit port, arranged to emit light rays directed as follows:
- b1) a significant percentage of rays directed at said forward elliptical reflector for single-reflection out said exit port;
- b2) a small percentage of rays directed out said exit port without reflection; and
- b3) the remaining significant percentage of rays directed toward said composite segmented spherical retro-reflector surface for retro-reflection back to said elliptical forward reflector and re-reflection out said exit port; and c) an elongation of said chamber (70) to extend beyond said exit port to permit post-focus divergence of the output light beam while still within the chamber; and d) lens means (72), integral with said single block, closing and sealing the chamber.

6. A compact, high-efficiency, projection lamp system, according to claim 5 further characterized in that:

said elongation of said chamber (70) is configured as a homogenizer (66).

7. A compact, high-efficiency, projection lamp system, according to claim 5 further characterized in that:

said elongation of said chamber(70) is configured as a fly's-eye lens array.

8. A compact, high-efficiency, lamp system, according to claim 5 further characterized in that:

said elongation of said chamber(70) is configured to also have a collimating lens (78).

* * * * *